Figure 1:
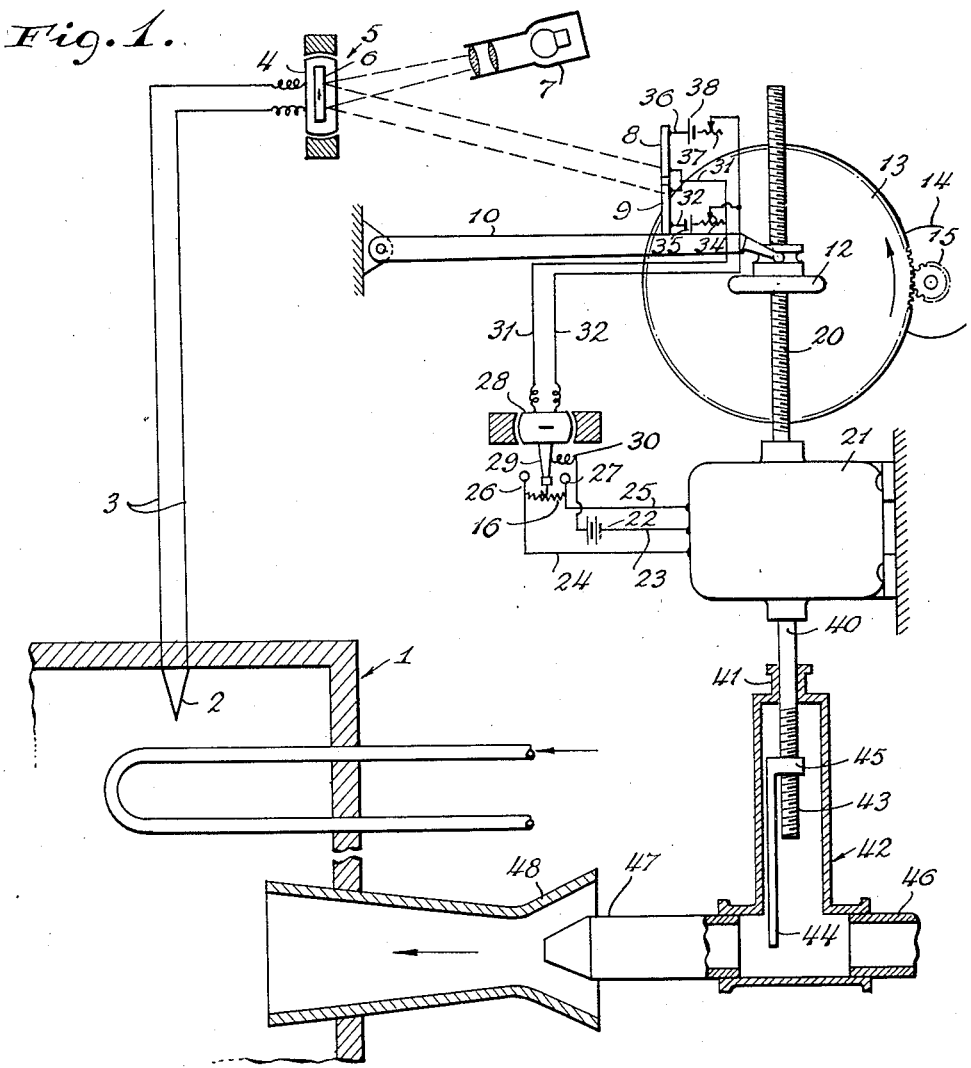

Nov. 23, 1943.  E. S. SMITH  2,335,163
PHOTOELECTRIC MECHANICAL RESET REGULATOR
Filed Nov. 17, 1941   4 Sheets-Sheet 1

INVENTOR.
Ed S. Smith

WITNESS:
George Du Bon

Nov. 23, 1943.  E. S. SMITH  2,335,163
PHOTOELECTRIC MECHANICAL RESET REGULATOR
Filed Nov. 17, 1941  4 Sheets-Sheet 2

WITNESS:
George Du Bon

INVENTOR.
Ed S. Smith

Nov. 23, 1943.  E. S. SMITH  2,335,163
PHOTOELECTRIC MECHANICAL RESET REGULATOR
Filed Nov. 17, 1941  4 Sheets-Sheet 3
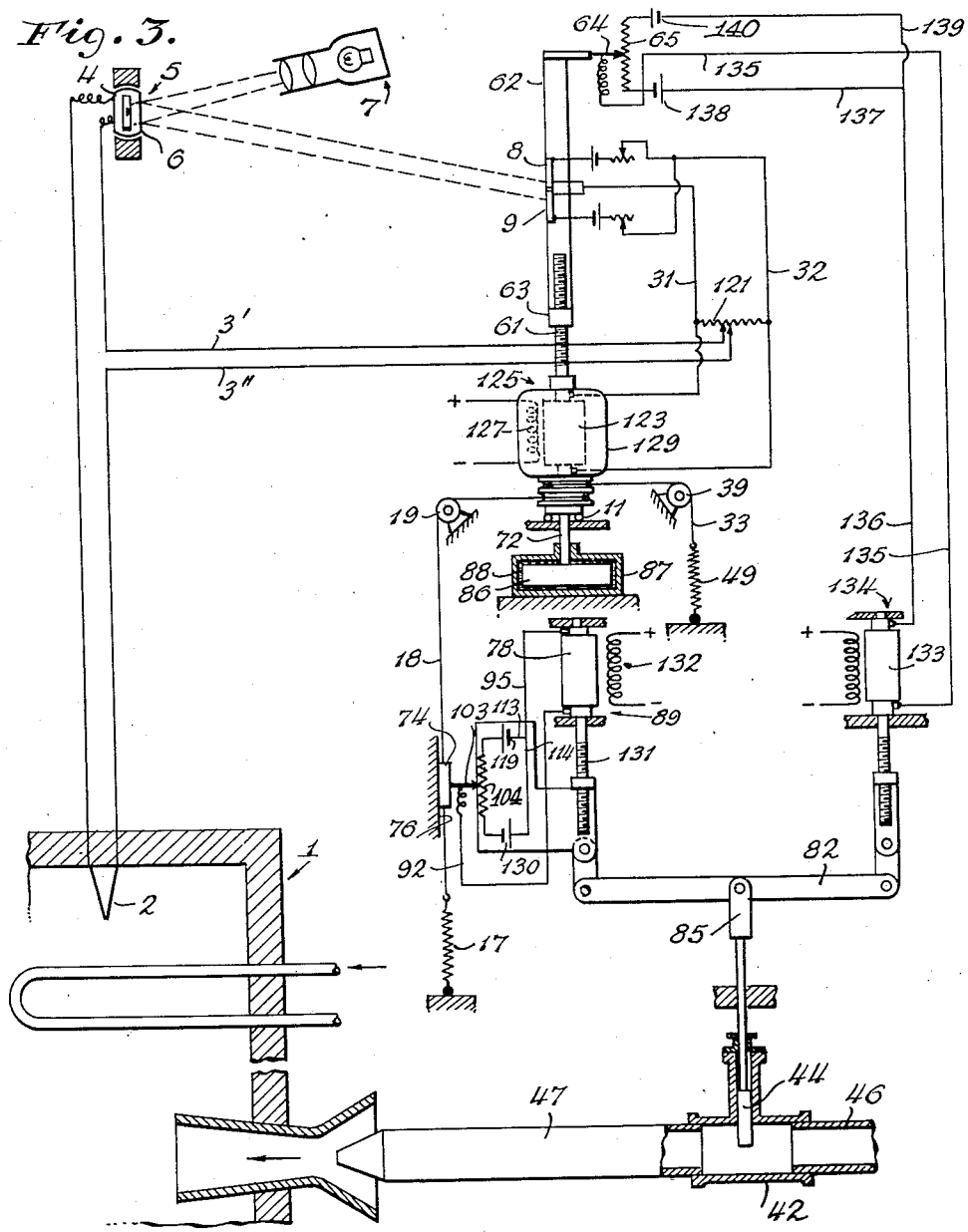
INVENTOR.
Ed S. Smith
WITNESS:
George DuBen Nov. 23, 1943.  E. S. SMITH  2,335,163
PHOTOELECTRIC MECHANICAL RESET REGULATOR
Filed Nov. 17, 1941  4 Sheets-Sheet 4
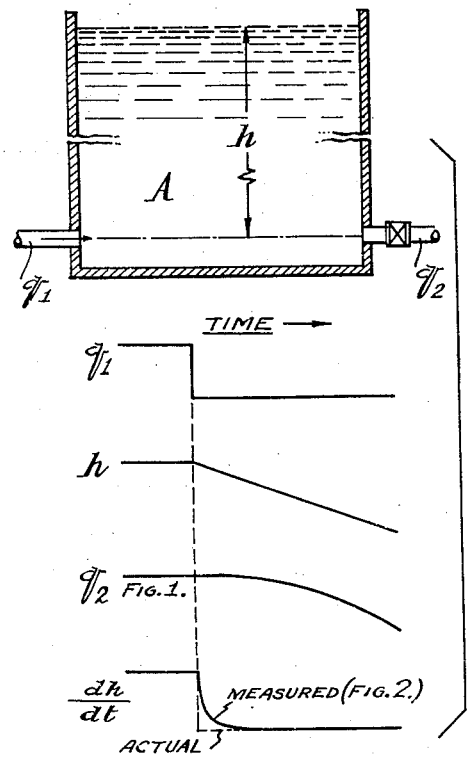
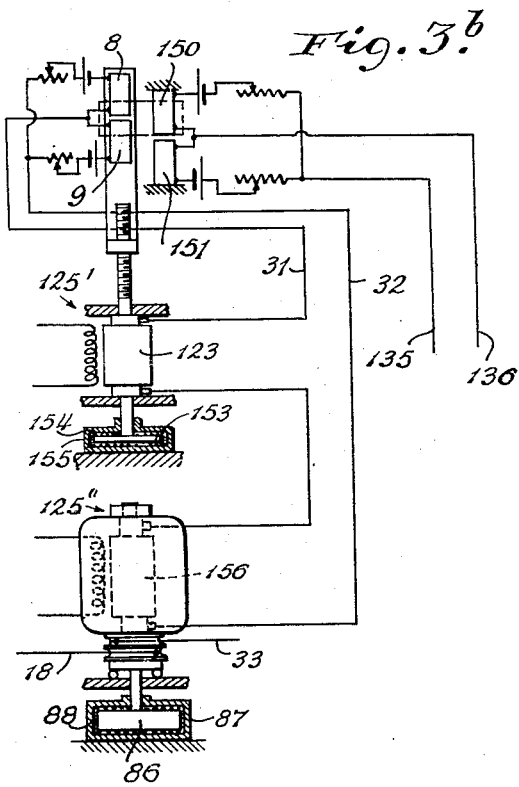
WITNESS:
George Du Bон
INVENTOR
Ed S. Smith Patented Nov. 23, 1943

2,335,163

UNITED STATES PATENT OFFICE 2,335,163

PHOTOELECTRIC MECHANICAL RESET REGULATOR

Ed S. Smith, St. Albans, N. Y., assignor to Charles J. Tagliabue Mfg. Co., Brooklyn, N. Y., a corporation of New York Application November 17, 1941, Serial No. 420,405

30 Claims. (Cl. 236—69)

This invention relates to methods of and apparatus for regulating a physical quantity or condition, e. g., such as temperature, which is variable with time.

A particular feature of the invention resides in means for photoelectrically governing a controller to provide a strong initial component which is proportional to the rate of change of a measured value of the variable condition and for thereafter gradually bringing the value of the regulated variable precisely to a set value.

The invention also provides for the use of a light beam as a follow-up to photoelectrically govern a servo-motor-operated element to stably position a controlling valve.

An additional object is to provide an extremely simple embodiment which has a desirably rapid early response followed by a more gradual response, which gives a regulated plant or process time to settle down after a disturbance. Another object of the invention is to provide another embodiment having an even more rapid initial response which is closely proportional to the rate of change of the measured variable, followed by a more gradual response in which the controller is gradually reset to cause the regulator variable to asymptotically approach its set value.

Still another object is to provide a photoelectrically balanced regulator, including a mirror galvanometer or the like, with means responsive to a rate component mechanically determined from a photoelectric follow-up for a beam of light reflected from the mirror. Others have also sought to attain generally similar objects and the instant invention appears to lie mainly in the particular combinations and subcombinations disclosed and in their structural relations since the elements of the combination are generally old. Thus the Baule French Patent 573,465, dated 1924, Fig. 8; Harrison Re. 21,309; and the Trinks book on "Governors, Governing Prime Movers," published 1919 by D. Van Nostrand Co., pp. 183–184; all show the use of a friction roller which is positioned from the center of its driving disk at a radial distance which is proportional to a rate or speed. This subcombination is also found in conventional integrators for flow meters of the head-type. Also the combination of a mirror galvanometer with a means for photoelectrically governing a controller is old in Stoekle et al. Re. 21,533. The desirability of trying to use the rate of response as well as the value of the response is also old, e. g., in Wünsch Re. 19,276; in Mason 1,782,045; and in Mitereff 2,020,847, as well as being used in a well known inertia type of governors for rotating prime movers, e. g., see Trinks, ibid, pp. 9–14.

The use of different means for compensating for the retardation of a galvanometer due to its back E. M. F. is also old in one form or another, e. g., see Smoot 1,796,697; Williams, Jr., 2,113,164 and 2,113,436; Young 2,115,834; Behr 2,113,928; and Behr et al. 2,124,684. However, the simple manner in which it is used in the instant case appears to be novel, direct and highly effective.

In regulation wherever there is some process lag or retardation in the plant itself, stability generally requires the provision of the earliest possible response of the right magnitude as soon after a disturbance as is possible with a gradual asymptotic approach to the desired value while the control effect is absorbing the disturbance. Since it is not generally satisfactory to wait until the variable has departed a substantial amount from the set control point before changing the position of the controller, it is desirable to use the rate of change, or a higher derivative, of the measured variable in detecting the disturbance at the earliest possible moment. Subsequently, the value of said variable is gradually brought back to its precise set value by some resetting means which preferably gives an asymptotic return and hence minimizes any tendency for hunting to be set up due to any abrupt action of the controller when it is approaching its ultimate position. There is always the difficulty that a response must have a fair magnitude before its rate of change can be accurately measured. Consequently, most regulators that have a reasonably early rate component rely upon allowing the rate component to be at all effective only after the departure itself has affected the controller sufficiently to stop the departure and then to pace the measured value back to the set control point and such pacing action tends to be unstabilizing if made at all rapid. In other words, they act according to the accumulated sum of the rates instead of to the rate itself. This is the case with the regulator of Fig. 1 in which a sudden change of the rate of change of the variable is not instantly followed by a corresponding sudden change of the position of the controller but in which the controller moves less than a distance proportional to the departure. This is occasionally satisfactory in practice, especially with processes in which the time of moving the valve to the position corresponding with the departure is generally far less than the process lag itself.

Figure 2:
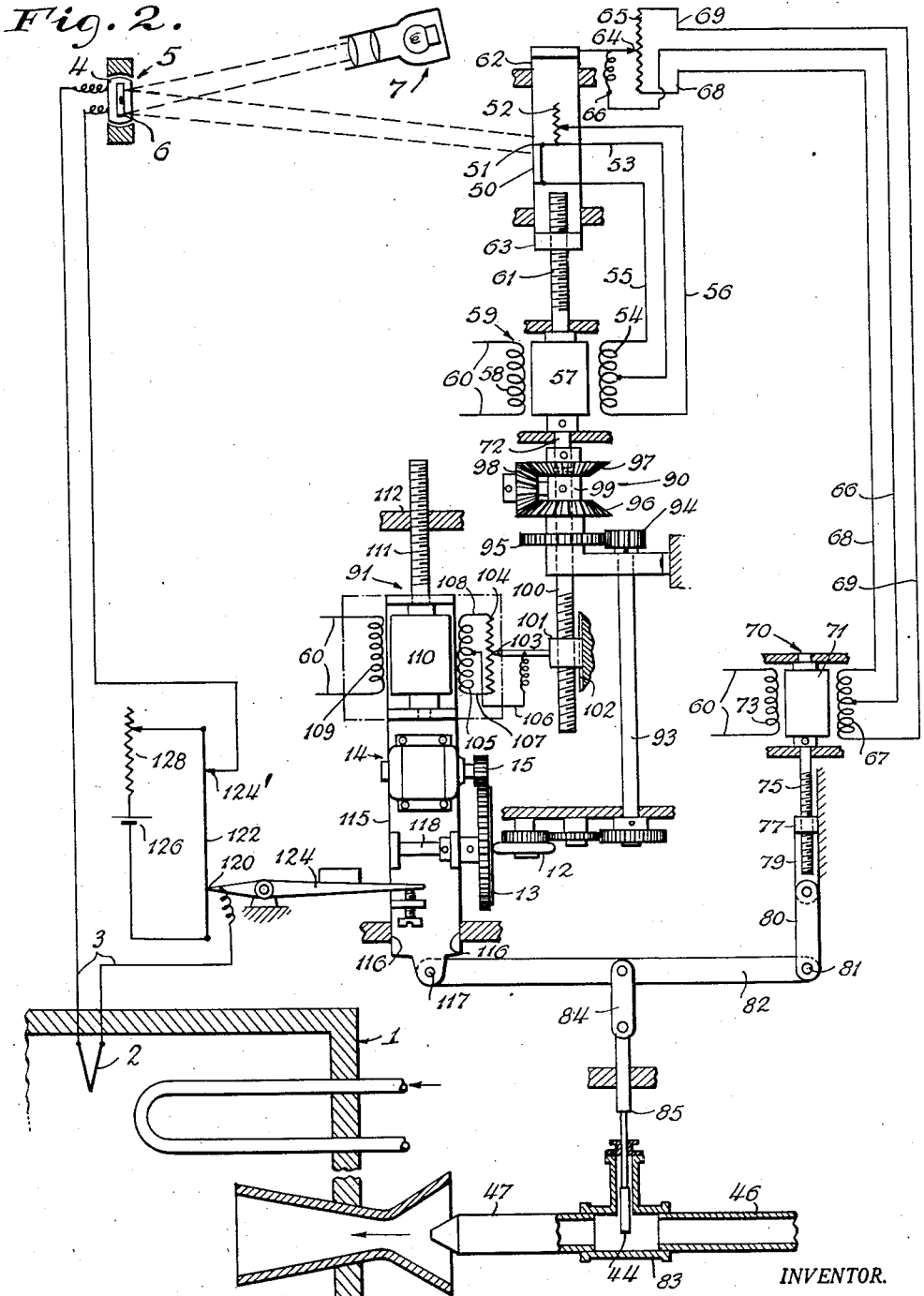

However, for cases where sudden changes of the variable occur and the lag in the process is appreciable and with a substantially dead time, following a disturbance, of at least the same order of a practicable time for initially adjusting the device Fig. 1, the embodiment of Fig. 2 has been provided.

In the more complex embodiment of Fig. 2, the positions of a mirror galvanometer and of its reflected light beam are converted into a corresponding photocell position by means of a servomotor initially proportional to the rate of the beam deflection, followed by a slow resetting of controller at a speed proportional to the amount of the departure; the speed of the servomotor is kinetically determined by means of a friction roller and disk so that the controller is positioned in a lively manner and through an extent proportional to the rate of change of the variable as determined from the speed of the follow-up; and the same kinetic determination of the servo-motor speed is additionally and simply used to offset the retarding effect of the back E. M. F. of the galvanometer by changing a point of connection of the galvanometer to one end of the slide wire which is used for setting the regulating value.

It is obvious that a higher derivative could be similarly used. For example, a second derivative should be used if the inertia of the galvanometer should be appreciable and a still higher derivative if necessary to provide an early response to a change in a process where plurality of sources of lag exist or if the normal disturbance for some other reason becomes evident only very gradually at the thermocouple. While temperature has been used throughout by way of example, the invention is not limited to temperature but may be used equally with other variables as required.

The much less complex dynamic embodiments of Figs. 3–3b also supply an initial control effect which depends upon the acceleration, as well as upon the velocity, of the follow-up servomotor, the preferred modification of Fig. 3a permitting a better compensation to be made for the different characteristics of the galvanometer and of the controller motor for the initial control effect than with the device of Fig. 2.

Thus it is seen that a main object of the invention is to provide an improved regulator which is simple and lively but at the same time is both stable itself and actively assists in stabilizing the controlled process by promptly and accurately combating disturbances and yet smoothing out the initial controlling effect so that the latter does not itself act as a disturbance.

These and other objects of my invention will appear to those skilled in the art from the accompanying drawings and specification, in which are illustrated and described several embodiments of the invention. It is my intention to claim all that I have disclosed which is new, inventive and useful.

In the accompanying drawings: Fig. 1 is a somewhat diagrammatic view, generally in elevation, illustrating a simple kinetic embodiment of the invention. Fig. 1a is a diagram of a single capacity system and its time curves of performance. Fig. 2 is a somewhat diagrammatic view generally in elevation of another kinetic embodiment of the invention which is more complex and lively. Fig. 3 is another like view of a dynamic embodiment of the invention while Fig. 3a is a like view of a preferred modified detail of Fig. 3. Fig. 3b is a diagrammatic view, generally in elevation, of a modification of a detail of the embodiment of Fig. 3 in which a single light beam illuminates both a fixed pair of photocells and a follow-up pair of photocells and the follow-up servomotor has but small inertia and a separate dynamometer-type motor of considerable inertia is used to provide a strong and prompt initial control component.

Figure 1

Referring to Fig. 1 in the drawings, the invention is applied to maintain a given temperature in a furnace 1 which contains a thermocouple 2 which is connected by lead wires 3 with coil 4 of the galvanometer 5. Coil 4 carries mirror 6. A focused beam of light is projected from a light source 7 onto the mirror 6 and reflected onto photocells 8 and 9 which are carried upon one end of lever 10 which is vertically positioned by friction roller 12 and the other end of which lever is pivotally mounted upon a horizontal pin. Driving disk 13 is rotated continuously in a counter-clockwise direction at a constant speed by means of motor 14 whose pinion gear 15 engages peripheral teeth on the driving disk 13 whose axis is disposed normal to the threaded shaft 20 of the friction roller 12 so that the disk continuously frictionally engages the roller with sufficient force to maintain driving contact. Shaft 20 is rotated by motor 21. One terminal of battery 22 is connected by the common wire 23 with the motor 21. The lines 24 and 25 respectively contact the forward and reverse coils of motor 21 with terminals 26 and 27 of the slide wire resistor 16 of the galvanometer type relay to whose coil 28 there is affixed a blade 29. A contact on the end of blade 29 is connected with the other terminal of battery 22 by the flexible lead 30. The arrangement is such that, when the contact 29 is at the midpoint of resistor 16, the motor 21 is stationary but operates in a clockwise direction when contact 29 moves to the left and in the opposite direction when 29 moves to the right.

Relay coil 28 is connected with photocells 8 and 9 as follows: Line 31 connects one side of both photocells 8 and 9 with one end of the coil 28. Another line 32 connects the other end of coil 28 with the other sides of photocells 8 and 9 through their respective resistors 37 and 34 and batteries 33 and 35.

Their arrangement is such that when the light beam is evenly disposed upon photocells 8 and 9, the relay coil 28 is in a balanced mid-position in which the contact 29 clears both terminals 26 and 27, the galvanometer type relay having a conventional torsion suspension for its coil 28 so that a definite neutral position of contact 29 exists when there is zero current flowing through coil 28.

Motor 21 has a continuation 40 of its shaft on the opposite side of the motor from shaft portion 20. Shaft portion 40 is smooth where it goes through the stuffing box 41 of the gate valve 42 and has a threaded end portion 43. The gate 44 has a female portion 45 threaded to fit the male portion 43. The gate 44 is arranged to be movable to alter the area of the valve opening. The body of valve 42 is attached to fuel supply conduit 46 and to fuel jet 47 which is located in the venturi 48 for the furnace 1. Fig. 1 is especially diagrammatic as to the position of the galvanometer and the relay whose coils are respectively 4 and 28, since the suspensions for said coils are ordinarily vertical.

The operation of the device of Fig. 1 is as follows: Starting with a steady condition which is continued long enough for both the regulator and the process to settle down, there occurs, e. g., a sudden change of either the fuel supply pressure or the load in the furnace 1 such that the temperature of thermocouple 2 begins to drop. The galvanometer mirror 6 rotates in a clockwise direction against the torsion of its suspension so that the reflected beam of light tends to be more fully on photocell 9 and to leave photocell 8.

The relay coil is unbalanced so that blade 29 is displaced a distance toward the left proportional to the leg of the photocells behind the beam to cause motor 21 to rotate in a forward direction which is clockwise when viewed from the top of the figure. This rotation forces friction roller 12 away from the center of the disk in a downward direction with a left-hand screw thread on shaft 20 in Fig. 1 so that the photocells 8 and 9 closely follow the light beam, lagging behind only enough to provide a sufficient bias of relay blade 29 to maintain the required motor speed. At the same time, gate 44 is raised due to the rotation of shaft 43 which has a right-hand thread.

Soon the resultant increased flow of fuel and heat input overcome the falling of temperature of thermocouple 2 so that the light beam stops. The motor 21 also stops rotating with the gate 44 in a wider opening position than it was originally. However, roller 12 is now being rotated by the constant speed disk 13 at a speed proportional to the radial distance of the roller 12 from the center of disk 13 with the result that photocells 8 and 9 move back toward their normal position at a gradually diminishing rate. If the valve 44 has already reached its ultimately correct position, the light beam will likewise return asymptotically to its normal position. With a suitable speed of disk 13, a correct position of the gate 44 is very soon reached in practice where the process lag does not make the problem of stability too serious.

*Figure 1a*

Referring to Fig. 1a which diagrammatically shows a single capacity process as a single reservoir. Suppose the inflow $q_1$ to a reservoir of area A is suddenly stopped after the inflow $q_1$ and outflow $q_2$ have been balanced so that the head $h$ is stationary. Immediately after $q_1$ stops, the level $h$ starts to drop at the rate $q_2/A$ and, to maintain constant value of level $h$, $q_2$ should also stop instantly. In Fig. 1, the temperature corresponds with $h$ of Fig. 1a while the heat capacity of the furnace corresponds with the area A of Fig. 1a, neglecting all but a single source of process lag. The change of position of the controller affects the direction of its operation and has been made in Fig. 1a to better show the lag relations, i. e., in Fig. 1a the demand is controlled while in the other figures the supply is controlled. However, it is apparent that the device of Fig. 1 cannot provide an instantaneous change of the controlled variable $q_2$. Instead the controlled variable $q_2$ initially changes at a rate which increases with the change of the head $h$. That is, the rate of change $q_2$ increases lineally with the change of the head $h$ and the amount of change of the position of the controlled valve varies with the square of the departure of the head $h$ or varies with the square of the elapsed time since the change of $q_1$ occurred, assuming that the effect of $q_2$ upon the level would not be instantly felt, which it would be of course in a single capacity system. However, in temperature control in practice, it takes an appreciable time for the effect of a change of fuel input to affect the current due to the temperature of the thermocouple 2.

With an actual plant having appreciable process lag between the movement of the control valve 44 and the response of galvanometer 4, it is very desirable to provide an earlier substantial movement of the controller providing this can be done without increasing the amount of movement undesirably before the process has had a chance to response. In other words, it is desirable to act immediately following such a change to offset the deficiency or excess which caused the disturbance.

The rate of change of the head $$\frac{dh}{dt}$$

shown as the lowest dotted line in Fig. 1a is seen to be practically proportional to the change of the inflow which is to be corrected. The driving disk and threaded roller of Fig. 2 may be used as a rate meter. However it, like all meters, has what is known as "metering lag." With a finite steady speed of rotation of the thread, the roller 12 will asymptotically approach an ultimate position at a definite radial distance of the center of disk 13. However, by having a high maximum speed of this threaded shaft, the metering lag can be reduced so that the response is as shown in the lowest solid curve of Fig. 1a. This is seen to be a considerable improvement, as regards the earliness of response, over the curve for $q_2$ which is produced by the device of Fig. 1.

However, the control by rate alone would be indefinite since the inevitable errors of metering the rate would cause the controlled temperature to drift with the passing of time. To overcome this difficulty, it is necessary to provide some sort of a resetting means so that the ultimate position of the controller depends only upon the actual value of the temperature itself or, in other words, upon the departure instead of the rate of departure. The device of Fig. 2 is such an improved regulator in which there is an initial control response which is proportional to the rate of change of the departure with a relatively slow floating component at a speed proportional to the departure.

Still referring to Fig. 1a, there are occasional cases in which there needs to be a still earlier response than can be provided by the measured first derivative, or rate of change, of the variable, in view of the metering lag involved in measuring said rate. In such cases it may be necessary to measure a still higher derivative which gives an earlier response as soon as there is an appreciable rate of change of the rate of change of the variable or as soon as the radius of the time-curve changes and before even the rate of change amounts to much.

A higher derivative control component is simply obtained by, e. g., using the force required to accelerate the appreciable mass of a servomotor. This has been done in the device of Fig. 3 so that the control valve may give an initial extra fuel input "shot" to offset the deficiency which has accumulated before being sensed by the regulator. In the device of Fig. 3a, the advantage of the early control action of Fig. 3 is retained while making the advancing E. M. F. for the galvanometer only sufficient to take care of its lag due to its back E. M. F., as is desirable in cases where inertia effects of the galvanometer are relatively small as compared with the process lags.

In the device of Fig. 3b the follow-up servomotor has a very low moment of inertia and an additional motor is provided which has a much higher moment of inertia. Both motors are provided with discs for producing viscous drag but the additional motor also has a fly wheel for producing the higher inertia. This permits an earlier initial servomotor response so that the light beam is closely followed while the effect of the additional motor may be made as great as is necessary for the desired magnitude of the initial controlling response. The second motor may be operated instead from a second resistor controlled by the relay of Fig. 1.

Figure 2

The device of Fig. 2 uses alternating current for its motors. As before, the temperature of furnace 1 is sensed by the thermocouple 2 and transferred by lines 3 to coil 4 of the galvanometer 5. Coil 4 carries mirror 6 which reflects a focused light beam from a source 7 thereof upon a single photocell 50 to be normally split by its edge 51. Balancing resistor 52 is adjusted to the same value as the resistance of the photocell 50 when the light beam is thus split by edge 51. Line 53 connects one side of the photocell 50 and one end of the resistor 52 with the mid point of shading coil 54. Lines 55 and 56 respectively connect the other effective sides or ends of photocell 50 and resistor 52 with the upper and lower ends of shading coil 54. This shading coil 54 is part of a shading coil motor 59 which has an armature 57 and a field coil 58. Field coil 58 is connected with A. C. supply lines 60. The armature 57 is attached to the upwardly projecting shaft 61 which has a right-hand thread.

Member 62 is arranged to be vertically slidable in the direction of the axis of shaft 61 and is provided with a nut portion 63 having female threads which mate with the male threads of shaft 61. The photocell 50 is affixed to member 62 and is movable therewith relative to the path of the reflected light beam and in the same plane as the travel of said beam. While lines 53 and 55 are shown connected with the top and bottom of the photocell 50, this connection has been thus shown only for purposes of illustration since, in practice, the connections would be to points located on the opposite edges of the photocell which are normal to the plane of the drawing and in the direction of the motion of the photocell. The arrangement is such that the servomotor operates to keep the light beam normally split by edge 51 of the photocell 50.

The upper end of the member 62 carries a sliding contact 64 for the fixed slide wire 65 so that the departure of the contact 64 from the mid position of slide wire 65 corresponds with the departure of the follow-up member 62 from its normal position. Sliding contact 64 is connected by flexible line 66 with the mid point of shading coil 67 of motor 70. The outer ends of the shading coil 67 are connected by lines 68 and 69 respectively with the lower and upper ends of slide wire 65.

Motor 70 also includes armature 71 and field coil 73 which is also connected with the A. C. supply lines 60. The shaft 75 for armature 71 is threaded and carries a nonrotating nut 77 which is a portion of link 79 which is pivotally connected with link 80 which in turn is pivotally connected by pin 81 with the right-hand end of control lever 82.

The arrangement is such that, upon a decrease of temperature of the thermocouple, the beam drops and servomotor 59 lowers member 62 and sliding contact 64 to cause motor 70 to operate at a speed proportional to the departure to give a resetting control component to the right-hand end of lever 82 which is actuated to further open gate 44 of control valve 83 which is located between the fuel supply line 46 and the fuel nozzle 47, the mid point of lever 82 being pivotally connected by link 84 with a stem 85 to which is affixed the valve gate 44.

The speed of the armature 57 of follow-up servomotor 59 is measured by means of the differential gear arrangement 90 which cooperates with the roller 12 and its friction disk 13 in obtaining a control component which is proportional to the velocity of the follow-up motor and hence of the rate of change of the measured value of the temperature by means of a third servomotor 91. The roller 12 is mounted to be axially but not rotatably constrained. In the arrangement disclosed in Fig. 2, the center of disk 13 is moved vertically until the speed of roller 12 equals that of armature 57. The rotations of roller 12 are carried by a chain of spur gears through shaft 93 and spur gears 94 and 95 to the lower bevel gear 96 of the differential 90, the upper bevel gear 97 of which rotates with armature 57 of the follow-up motor 59. This differential also has idler bevel gear 98 which is mounted upon a collar 99 affixed to shaft 100 whose lower end is threaded and engaged by a mating nut 101 which is kept from rotating by a slide ways 102.

The arrangement is such that, upon a greater speed of armature 57, in a direction to lower the follow-up member 62, than the speed of gear 96, the nut 101 is raised by the threaded shaft 100. Servomotor 91 is adapted to follow a sliding contact 103, affixed to nut 101, along a slide wire 104 for the sliding contact 103 as before, slide wire 104 being movable with motor 91. The mid point of a shading coil 105 of motor 91 is connected by flexible lead 106 with the sliding contact 103. The ends of coil 105 and of the slide wire 104 are connected by lines 107 and 108. The field coil 109 is connected with A. C. supply lines 60. This motor 91 also has an armature 110 and a threaded shaft 111 which passes through a fixed mating nut 112.

The arrangement is such that the motor operates to move itself bodily and its attached slide wire 104 until the mid point of the slide wire automatically reaches sliding contact 103. Motor 91 is mounted upon a member 115 which is vertically slidable in the fixed ways 116 so that member 115 is constrained to move only in a vertical direction. The lower end of member 115 is pivotally connected by pin 117 with the left-hand end of the control lever 82, the arrangement being such that an appreciable rate of movement of the follow-up 62 in a downward direction, which would accompany a drop in the temperature of the thermocouple 2, results in a prompt and substantial upward movement of member 115 and a consequent opening of the controller gate 44 for the fuel supply.

Also carried by member 115 is the axle 118 of the friction disk 13 which is provided as before with peripheral teeth which are drivingly engaged by the small spur gear 15 which is rotated by constant speed motor 14 which is affixed to member 115. The arrangement is such that the roller 12 is frictionally driven by disk 13 as long as the axis of disk 13 has been moved vertically away from its normal position.

A feed-back to the thermocouple circuit, to offset the retarding effect upon the galvanometer of its back E. M. F., is provided by a contact 120 which is movable along slide wire 122 for this purpose by a lever 124 which is adjustably connected with member 115 whose position corresponds with the measured rate of change of the temperature.

The temperature of regulation is set by the position of contact 124' which is manually adjusted along slide wire 122. In series with the slide wire 122 are the operating battery 126 and the adjusting calibrating resistor 128, the circuit containing elements 122, 124', 126, 120 and 128 being shown by way of example as a conventional potentiometric circuit.

The operation of the device of Fig. 2 is as follows. Assume that there is a sudden change of either the rate of flow of the load of furnace 1 or the pressure of the fuel supply in line 46 such as would cause a drop in the temperature of thermocouple 2. The galvanometer slowly lowers its light beam so as to be no longer split by the upper edge 51 of photocell 50 but to be more upon the surface of photocell 50 and hence to lower the resistance of the latter. The result is that the currents in the opposing parts of the shading coil 54 are no longer balanced and armature 57 of motor 59 rotates in a direction to lower the member 62 from its normal position. This also lowers contact 64 from the mid point of its slide wire 65 and likewise similarly upsets the current balance of the opposing portions of shading coil 67 of motor 70 and causes its armature 71 to rotate its threaded shaft 75 and hence to slowly raise the right-hand end of control lever 82 and the gate 44 of the controller for the fuel supply. But the effect of such component is not enough to combat a rapid change of the temperature of a process which has constant lag. Instead the rate of change of the temperature must be taken into account as follows.

The rotation of armature 57 and the follow-up servomotor 59 causes idler gear 98 and its collar 99 to turn the threaded shaft 100 to rapidly raise the sliding contact 103 from its normal position in the middle of the resistor 104. The threads on shaft 100 have a steep pitch and are preferably in multiple to give a rapid axial response to rotation. This contact displacement causes the operation of the motor 91 in a direction to raise the resistor 104 until its mid point is again opposite contact 103. This also raises motor 91 and member 115 bodily due to the rotation of threaded shaft 111 through its fixed nut 112. This also raises the center of disk 13 until its friction roller 12 very soon rotates gear 96 at the same speed as that of armature 57 of the follow-up motor 59. In other words, member 115 is very soon raised a distance which corresponds with the speed of armature 57 which in turn closely corresponds with the rate of change of the temperature of thermocouple 2.

A lowering of the temperature of thermocouple 2 correspondingly lowers its voltage. The effect of the back E. M. F. of the galvanometer is to resist the motion of the mirror galvanometer so that it is less rapid than it should be. This is offset by changing the effective length of the slide wire 122 between the manually set contact 124 and the contact 120 which is moved in proportion to the displacement of member 115 from its normal position and hence is proportional to the velocity of the motor 59 and of the light beam from mirror 6 of the galvanometer. This condition is seen to be satisfied in Fig. 2 in which an upward movement of member 115 corresponds with the rate of lowering of the temperature which is accompanied by a lowering of the contact point 120 to compensate for the back E. M. F. As the temperature approaches equilibrium and the galvanometer stops, servomotor 59 will also gradually stop and contact 120 will also be brought back to its normal position. An adjustment screw is provided to set the contact point 120 at its desired normal position in which the axis of disk 13 is in line with its friction roller 12.

In brief, a change of the load causes the temperature of thermocouple 2 to change at a rate which depends upon the amount and abruptness of the load change. The galvanometer then swings its light beam at a rate which depends upon the rate of change of the temperature and the photocell 50 slowly follows the light beam, lagging only enough behind it to keep the follow-up servomotor operating. Before the departure itself amounts to much, the rate of change of the temperature is measured by the position of nut 101 which is positioned by the differential 98 which is sensitive to the difference of the speed of armature 57 of the follow-up servomotor 59 from that of gear 96 which is proportional to that of roller 12 which is friction-driven by disk 13 whose center is moved vertically far enough to make the two speeds equal. The second member 115 is moved by its servomotor 91 to follow nut 101 through a distance which is proportional to the measured rate of change of the temperature. This member 115 operates the controller through a proportional distance to give an early prompt control effect according to the rate of change of the temperature. The movement of member 115 also changes the point of connection to the potentiometric slide wire so that the retarding effect of the back E. M. F. of the galvanometer is completely overcome. There is continuously applied a floating component at a much lower rate which is proportional to the temperature departure as determined by the position of contact 64 on slide wire 65, the motor 70 being operated to provide a floating control effect which very gradually resets the controller to bring the measured value of temperature precisely back to the set value.

Figure 3

The device of Fig. 3 is D. C.-operated and has two photo-cells as in the case of Fig. 1 but otherwise it more closely resembles the device of Fig. 2 and provides an earlier substantial control effect than is possible with the devices of Figs. 1 and 2. In the device of Fig. 1 the initial control effect is limited to the departure and in Fig. 2 depnds mainly on the rate of departure, but in the device of Fig. 3 an initial substantial control effect depends upon the second derivative as well as upon the first derivative of the departure with respect to time. In other words in the device of Fig. 3, the acceleration as well as velocity cooperates to supply an initial substantial control component or effect.

In Fig. 3, the thermocouple circuit, mirror galvanometer, light and photocell arrangement are as in Fig. 1, except that an advancing E. M. F. is supplied through lines 3' and 3" which respectively connect one side of the galvanometer and of the thermocouple with closely-spaced points upon the potentiometric resistance 121 whose ends are subjected to a difference of potential which is proportional to the relative displacement of the mirror-reflected light beam and of cells 8 and 9. As appears later herein, the circuit connecting the photocells 8 and 9 with armature coil 123 is the same as shown in Fig. 1 except that the relay coil 28 of Fig. 1 corresponds with the armature coil 123 of Fig. 3 and that leads 31 and 32, which connect said coils with the photocell arrangement are also connected to the ends of resistor 121. The follow-up servomotor 125 has a threaded shaft 61 attached to its armature and provided with the mating nut 63 which is attached to follow-up member 62 as in Fig. 2.

The motor 125 is of the dynamometer type in which the field coil 127 and its housing 129 have a small moment of inertia and are oscillatable upon shaft 61, being supported on a ball-race 11. When the motor is stationary, housing 129 is biased toward a definite normal position by tension spring 17 whose lower end is fixed and whose upper end is connected by cord 18 which passes over pulley 19 and secured to a cylindrical portion of the motor housing 129 which is concentric with its shaft. The housing is biased in the other direction by a similar cord 33 which passes over pulley 39 and whose ends are respectively connected with a like portion of housing 129 and with the second spring 49. The motor shaft has a lower extension 72 to which is attached a cylindrical flywheel 86 which is immersed in cylindrical tank 87 which contains a liquid 88 of high viscosity such as oil or of high density such as mercury, the high viscosity liquid being preferable as providing the more nearly lineal relation between viscosity and torque.

When the servomotor 125 is started by the movement of the light beam relative to the photocells 8 and 9, the field housing 129 is quickly moved through an angle which depends upon the velocity and acceleration at that instant.

The velocity and acceleration controlled component is measured by the displacement of housing 129 from its normal position. Cord 18 is likewise displaced a proportional amount and carries element 74 which moves vertically in its slideway 76 to position sliding contact 103 relative to the mid point of resistor 104. The sliding contact 103 is connected with one end of the armature coil 78 of reversible motor 89 by line 92 which has a flexible portion near the sliding contact 103. The other end of coil 78 is connected by line 95 with the junction of lines 113 and 114 which are connected with the ends of resistor 104 and respectively include batteries 119 and 130, the arrangement being generally similar to that used with the photocells of Fig. 1.

The shaft 131 of motor 132 is threaded and connected with the left-hand end of the control lever in the same manner as the right-hand end of the control lever is connected with its motor in this figure and in Fig. 2. The control lever 82 is also connected as in Fig. 2 with the sliding gate of the control valve. The arrangement operates to give a substantial prompt response to a control valve following a disturbance of the furnace conditions.

As in Fig. 2, the followup member 62 carries at its upper end a sliding contact 64 whose displacement from the mid point of slide wire 65 determines the proportional rate of changing a floating reset component. One end of the armature coil 133 of reversible motor 134 is connected by line 135, having a flexible portion, with sliding contact 64 and by line 136 with the junction of line 137, which contains battery 138, with line 139, which contains battery 140, the arrangement of lines 137 and 139 which are connected with the ends of resistor 65 being generally similar to that used with the photocells of Fig. 1. The floating component reaches the right-hand end of control lever 82 as in Fig. 2, through the rotation of a threaded shaft for the motor and an axially but not rotatably movable nut.

The operation of the device of Fig. 3 is generally similar to that of Fig. 2, the principal difference being that the initial control component is determined from the torque of the follow-up servomotor instead of using the disk and friction roller of Fig. 2.

Another advantage of the device of Fig. 3 is the fact that the extra torque at the time of starting provides an often-needed additional and still earlier control response due to the inertia of the flywheel. Further this inertia effect is advantageous where the galvanometer has considerable inertia. Since the feed-back connections through lines 3' and 3" to resistor 121 are adjustable, a partial compensation may be readily effected for the back E. M. F. of the galvanometer since both it and that of resistor 121 between the connections 3' and 3" depend upon the rate of change of the beam position.

*Figure 3a*

However, when the galvanometer has small inertia, it may be desirable for stability to free the galvanometer from any possible effect of the kick due to the inertia component of the follow-up. This is done in the modification of Fig. 3a in which advantage is taken of the fact that the rotating flywheel tends to drag its tank along with it, due to the viscosity of the oil. This drag is converted into a position by oscillatably mounting tank 141 upon a ball-race 142 and providing it with a lever 143 which is attached to tank 141 and is located between springs 144 whose adjacent ends are attached to arm 143 and whose outer ends are fixed. Contact 145 is mounted at the outer end of lever 143 and is flexibly connected with line 3'. Line 3" is connected with the mid point of the potentiometric slide wire resistor 146 whose ends are connected by line 147 with battery 148 and with adjustable resistor 149 which is inserted in lines 147 for adjusting the amount of advancing E. M. F. as required to counteract the back E. M. F. of the galvanometer.

The operation of the device of Fig. 3 modified as in Fig. 3a is generally the same as in Fig. 3 and as follows: Upon a change in, e. g., the load, on the furnace, the temperature of the thermocouple 2 changes gradually. The galvanometer then gradually deflects the light beam from its normal position in which the beam is equally divided upon photocells 8 and 9. The motor starts and comes up to speed so that the photocells closely follow the light beam as it moves. Due to the starting torque, there is a strong initial controlling impulse which is in excess of that required to overcome the viscous drag on the tank 141 due to the velocity of this motor. However, the galvanometer which is a low inertia type is not affected by the starting torque of the follow-up motor but is only affected by its back E. M. F. which is balanced by the advancing E. M. F. between lines 3' and 3" which are respectively at the E. M. F.'s of point 145 and the mid point of resistor 146. The value of the advancing E. M. F. may be adjusted by the rheostat 149 so that the measuring lag of the galvanometer is largely eliminated.

*Figure 3b*

In the device of Fig. 3b, the light beam provides an image which is elongated horizontally and its vertical movement affects two pairs of photocells 8 and 9 and 150 and 151 which respectively govern the following-up servomotor 125' through lines 31' and 32' and the reset motor 134 through lines 135 and 136 which in Fig. 3 is governed by the displacement of sliding contact 64 relative to the mid point of its slide wire 65. Photocells 8 and 9 also govern the operation of an additional motor 125" which is of the same dynamometer type as motor 125 in Fig. 3 and is likewise provided with a flywheel immersed in a viscous liquid. Motor 125' is provided with a thin disk 153 of low inertia which is immersed in a liquid 154 of high viscosity contained in a fixed cylindrical tank 155. However, motor 125' is not of the dynamometer type while motor 125" is. Motor 125" functions in the same manner and for the same purpose as motor 125 as regards the governing of the first control component through the displacement of cords 18 and 33. Motor 125' serves only the purpose of causing photocells 8 and 9 to follow the light beam. The armature coil 123 of motor 125' is in series with that 156 in lines 31' and 32'. In this embodiment there is a prompt follow-up action of motor 125' and a powerful initial control effect due to the motor 125". In this embodiment, the advancing E. M. F. may be provided if desired as in either Fig. 3 or Fig. 3a.

To make full use of the instant invention, it is important that the galvanometer be free from parts of high inertia such as mechanical booms, etc., and that it be continuously free to move instantly upon the least change of the thermocouple temperature as indicated by its voltage. In other words, this invention is limited to continuously free galvanometers or the like which photoelectrically govern a controller since the use of photoelectric means permits the use of, e. g., a small mirror of low inertia in the galvanometer. While the selenium type of photocell has been shown, other types of photoelectric elements such as, e. g., vacuum-type phototubes may be used instead with suitable electronic amplifying means instead of the galvanometer type relay 28 of Fig. 1. The kinetic means of Figs. 1 and 2 cooperate in a novel manner with the rest of the combination, position being of the essence in photoelectric governing, to provide a continuous resetting relation between the departure and the controller operation in Fig. 1 and an accurate and prompt measurement of the rate of response in Fig. 2. In Fig. 1 the kinetic means acts to provide an initial impulse substantially proportional to the departure followed by a gradual resetting asymptotically to the control point. The use of the roller and its friction-disk drive is shown as one example of a kinetic means and other equivalent kinetic means such as the "tractrix roller on cylinder" may be likewise employed. Likewise the use of the dynamic means of Fig. 3 may have equivalents in other dynamic means which fulfill the same function. The particular sort of servomotor used, i. e., whether A. C. or D. C. is not important or even whether it is electrically powered, as long as the motor has like inertia and is connected to function in the manner described as to providing a floating or a proportional action.

Also it is not important whether the control valve be directly actuated by the motor disclosed or whether this same sort of operation is attained telemetrically. Thus for example, in Fig. 1, instead of having motor 21 directly actuate both the threaded shaft for the friction roller and that for gate valve, two like small motors could be moved, one at the instrument and the other at the valve which may be some distance away, the small motor at the valve acting as a pilot motor for a larger motor, as is commonly done in this art. This telemetric relation can be obtained by other means equivalent to those shown, e. g., by cyclically transmitted impulses of a function of time corresponding with values of the variable to be transmitted, e. g., see Smith Patents 2,161,300 and 2,263,055. But the continuous method of operation discussed herein is considered preferable as giving a prompter response and hence as enabling a more nearly ideal control action to be obtained.

Also it is noted that the invention is not limited to a particular sort of galvanometer circuit but this may be, e. g., of the potentiometer type as shown in Fig. 2, as a milli-ammeter type in Figs. 1 and 3, or as a Wheatstone bridge type (not shown).

The terms and expressions which I have employed in the specification are used as terms of description and exemplification but not of limitation, and I have no intention, in the use of such terms and expressions in the claims, except as hereinabove stated, of excluding any equivalents of the features shown and described or portions thereof, but recognize that various modifications and separate use of the several subcombinations disclosed are possible within the scope of the invention claimed.

I claim:

1. In a regulator for a physical variable, the combination of a meter for said variable including a mirror for deflecting a focused beam of light reflected from the mirror, a photocell in the path of the beam, a servomotor-operated follow-up means operatively connected to said photocell to move the photocell to follow the beam with a speed which is proportional to the relative displacement of the beam and the photocell and including a servomotor electrically connected with said photocell, a means for continuously mechanically measuring at least the first derivative of the displacement of the follow-up means and hence of the beam from a fixed normal position, a means for controlling the variable in accordance with the position of such means, and a governing means for continuously maintaining the displacement from a fixed position of the controlling means proportional to the sum of a proportional component which is proportional to the stated derivative measurement and of a floating component whose rate of change is proportional to the stated displacement of the beam from its normal position.

2. In a regulator for a physical variable, the combination of a meter for said variable including a mirror for deflecting a focused beam of light reflected from the mirror, a photocell in the path of the beam, a servomotor-operated follow-up means operatively connected to said photocell to move the photocell to follow the beam with a speed which is proportional to the relative displacement of the beam and the photocell and including a servomotor electrically connected with said photocell, a means for continuously kinetically measuring at least the first derivative of the displacement of the follow-up means and hence of the beam from a fixed normal position, a means for controlling the variable in accordance with the position of such means, and a governing means for continuously maintaining the displacement from a fixed position of the controlling means proportional to the sum of a proportional component which is proportional to the stated derivative measurement and of a floating component whose rate of change is proportional to the stated displacement of the beam from its normal position.

3. In a regulator for a physical variable, the combination of a meter for said variable including a mirror for deflecting a focused beam of light reflected from the mirror, a photocell in the path of the beam, a servomotor-operated follow-up means operatively connected to said photocell to move the photocell to follow the beam with a speed which is proportional to the relative displacement of the beam and the photocell and including a servomotor electrically connected with said photocell, a means for continuously dynamically measuring at least the first derivative of the displacement of the follow-up means and hence of the beam from a fixed normal position, a means for controlling the variable in accordance with its position, and a governing means for continuously maintaining the displacement from a fixed position of the controlling means proportional to the sum of a proportional component which is proportional to the stated derivative measurement and of a floating component whose rate of change is proportional to the stated displacement of the beam from its normal position.

4. The combination set forth in claim 2 in which the measuring means comprises a roller, a disk arranged to frictionally drive the roller at a speed which is proportional to the radial distance of the roller from the center of the disk, a motor for continuously rotating the disk at constant speed, a differential whose opposing parts are respectively actuated by the servomotor and by the roller and whose idler is moved relative to a fixed normal position upon a difference between the speeds of said parts and hence of said servomotor and said roller so that the idler's displacement from said position asymptotically attains correspondence with the speed of the servomotor and hence with the measured rate of change of the variable, and a means for maintaining the radial distance of the roller from the center of the disk proportional to the stated displacement of the idler while maintaining the axis of the roller and the disk in the same plane; and said governing means includes a connection between the idler and the controlling means operative to actuate the controlling means for an extent proportional to the stated displacement of the idler and hence to the measured rate of change of the variable.

5. In a regulator for an electrical variable, the combination of a mirror galvanometer for said variable for deflecting a focused beam of light reflected from the mirror, a photocell in the path of the beam, a servomotor-operated follow-up means connected to the said photocell to move the photocell to follow the beam at a speed which is substantially proportional to the relative displacement of the beam and the photocell, said servomotor being of the dynamometer type in which the driving torque is measured by a proportional angular displacement of the motor housing and in which the armature is provided with a damping means for causing its torque to be proportional to its speed, a means for controlling the variable in accordance with the position of such means, and a governing means operatively connected with the motor housing to continuously maintain the displacement from a fixed position of the controlling means proportional to the sum of a proportional component, which is maintained proportional to said angular displacement and hence which is dependent upon at least the first derivative of the variable, and of a floating component whose rate of change is proportional to the displacement of the beam from its normal position.

6. The combination set forth in claim 5 in which the servomotor armature is constructed to have a considerable moment of inertia, whereby the proportional control component is additionally increased soon after a response of the galvanometer position to a change in the variable to compensate for at least the metering lag of the galvanometer.

7. In a regulator for an electrical variable, the combination of a mirror galvanometer for said variable for deflecting a focused beam of light reflected from the mirror, a photocell in the path of the beam, a servomotor-operated follow-up means connected to said photocell to move the photocell to follow the beam with a speed which is substantially proportional to the relative displacement of the beam and the photocell, said servomotor being of the dynamometer type in which the driving torque is measured by a proportional angular displacement of the motor housing and in which the armature is provided with a damping means for causing its torque to be proportional to its speed, a feed-back means sensitve to a condition of the servomotor which is affected by at least one derivative of the rotation of its armature for regeneratively modifying the value of the galvanometer-measured electrical variable to substantially counteract at least the back E. M. F. of the galvanometer, a means for controlling the variable in accordance with the position of such means, and a governing means operatively connected with the motor housing to continuously maintain the displacement from a fixed position of the controlling means proportional to the sum of a proportional component, which is maintained proportional to said angular displacement and hence which is dependent upon at least the first derivative of the variable, and of a floating component whose rate of change is proportional to the displacement of the beam from its normal position.

8. The combination set forth in claim 7 in which said damping means comprises a flywheel disk mounted on the armature-shaft of the servomotor, a damping fluid surrounding said flywheel, and a container for the flywheel disk and for said fluid; said container being resiliently and rotatably mounted to be oscillatable about the axis of the flywheel disk through an extent proportional to the speed of the flywheel disk; and in which said feed-back means includes a slide-wire having a potential drop along it and having one connection to the galvanometer at a fixed intermediate point on the slide-wire and another at a sliding contact for the slide-wire, said sliding contact being positioned by the said oscillatable container for the damping means of the servomotor armature to set up an E. M. F. between said contacts proportional to the speed of the servomotor and hence substantially proportional to the rate of change of the variable.

9. In a regulator for a physical variable, the combination of a meter for said variable including a mirror for deflecting a focused beam of light reflected from the mirror; photocell means in the path of the beam; a servomotor means electrically connected to at least a portion of said photocell means; said servomotor means including motor means operating at a speed at least approximately proportional to the relative displacement of the beam and the photocell, a means continuously responsive to the speed of said motor means, and a means continuously responsive to the acceleration of said motor means, a portion of said motor means being operatively connected with said photocell to move the photocell to follow the beam with a speed proportional to that of the thus-connected motor means portion; a means for controlling the variable in accordance with the position of such controlling means; and a governing means for continuously maintaining the displacement from a fixed position of said controlling means proportional to the sum of a proportional component and of a floating component whose rate of change is proportional to the stated displacement of the beam from its normal position, said governing means being operatively connected with both of said continuously responsive means to move a portion of said controlling means through an extent proportional to the sum of the responses of said continuously responsive means and said governing means including a motor connected with a portion of said photocell means and with a portion of said controlling means to move the last mentioned photocell means portion at a rate proportional to the stated displacement of the beam relative to the last mentioned portion of said photocell means.

10. The combination set forth in claim 9 in which the variable is electrical and the meter is a galvanometer and in which the combination includes a feed-back means to the galvanometer, which feed-back means is controlled by the response of at least one of said continuously responsive means to regeneratively modify the value of the galvanometer-measured electrical variable to substantially counteract at least the back E. M. F. of the galvanometer.

11. In combination, a normally balanced galvanometer sensitive to an electrical variable, a source of light projecting a beam of light, a member carried by said galvanometer for deflecting said beam from a fixed normal position, a light sensitive means responsive to said beam, means for controlling the value of said variable, and a means for governing the controlling means and including a first inherently stable portion continuously governed by the response of the light sensitive means to tend to maintain said light sensitive means in the path of said beam and a second portion continuously operating to tend to return the beam to said normal position at a rate which decreases continuously as said normal position is approached.

12. In a control system, a normally balanced relay means including a deflecting member, a radiant energy responsive means for unbalancing said relay means to deflect said member on a departure from normal of a control quantity, and a means for balancing said relay means and including a portion moving the radiant energy responsive means at a rate proportional to the deflection of the member to alter the value of the control quantity to provide an initial balancing component and a floating control portion simultaneously moved from a normal position by the first named portion and tending to return to its said normal position, and to return the radiant energy responsive means to a corresponding normal position, both at a rate which is proportional to the extent of such movement to gradually alter the value of the control quantity to provide a subsequent balancing component tending to restore the relay means to its normal balanced condition.

13. In a control system, a normally balanced relay means including a deflecting member, a radiant energy responsive means reacting upon said relay means to deflect said member, and a means for balancing said relay means and including a portion moving the radiant energy responsive means at a rate proportional to the deflection of the member to provide an initial proportional balancing component and a floating control portion simultaneously moved from a normal psition by the first named portion and tending to return thereto, and to return the radiant energy responsive means to a corresponding normal position, both at a rate which is proportional to the extent of such movement to gradually provide a subsequent balancing component tending to restore the relay means to its normal balanced condition.

14. In combination, a source of light, a light-deflecting member adjustable on a change in a controlling condition from a normal position into different positions depending on the extent of said change and receiving light from said source and deflecting it in a direction varying with the position of said member, apparatus receiving light deflected by said member and comprising a light sensitive device mounted for movement to follow the deflected light and which when said member is in a normal position relative to the path of the light coming to said apparatus receives a definite portion of the light deflected by said member, adjusting means actuated by said device at a rate proportional to the lag of the sensitive device behind the position of the deflected light as sensed from the difference between the amount of light received and said light portion to effect a compensating adjustment of the position of said device relative to said path on a change in said relative position resulting from a change in the position of said member, and a condition controlling means having one portion actuated simultaneously with said adjusting means to provide an initial control response proportional to the change of the controlling condition and another portion to provide a floating control response to slowly return said member to said normal position at a rate which is continuously proportional to the extent of its displacement from its said normal position.

15. In combination, a normally balanced galvanometer sensitive to an electrical variable, a source of light projecting a beam of light, a member carried by said galvanometer for deflecting said beam from a fixed normal position, a light sensitive means responsive to said beam, a follow-up means including a first portion governed by the response of the light sensitive means to tend to maintain said light sensitive means in the path of said beam and a second portion continuously operating to tend to return the light sensitive means to a fixed normal position at a rate which decreases continuously as said normal position is approached, means for controlling the value of said variable, and a governing means operatively connecting the follow-up means with the controlling means to move the controlling means in proportion to a non-lagging and preferably leading function of the deflection of the light sensitive means from its said normal position.

16. In a regulator for a physical variable, the combination of a meter for the departure of the value of the variable from a predetermined value, a servomotor-operated follow-up for the measured value, a meter for the speed of the servomotor, a means for controlling the value of the variable, said meter including a means for damping the servomotor speed by imposing a drag against said speed which is proportional to said speed, and a means whose position is responsive to said drag for governing the controlling means in accordance with the position of the last named means and hence with said speed; and an additional means for resetting the controlling means gradually to a position which tends to asymptotically restore the measured value precisely to its predetermined value.

17. The combination set forth in claim 16 in which the damping means includes a damping fluid in which is immersed an element moving with the servomotor armature and the drag reacts upon a resiliently mounted member also exposed to said fluid, whereby the drag of the last named member is measured by a proportional displacement of said member from a normal position.

18. In a controlling system, the combination of a means for controlling the position of a light beam, a photocell in the path of the light beam, a servomotor for positioning the photocell along said path to maintain the photocell under constant illumination by said beam, a constant speed element, a meter for the speed of the servomotor and including a part whose speed varies with its position relative to that of said element and also including a differential means having a portion whose displacement from a normal position substantially corresponds with the difference between the speeds of said servomotor and of said part, a second servomotor for altering the relative position of said meter part and of said element, and a means controlled by the position of said differential means to govern the second servomotor to alter said relative positions at a rate proportional to said speed difference and in a direction to eliminate said difference, whereby the stated relative position is maintained in correspondence with said speed with sufficient power to be useful in governing the controlling of said system.

19. The steps in the method of regulating the value of a physical variable which comprise metering the value of the variable by a corresponding position of a metering element, displacing a light beam from a fixed normal position in proportion to the displacement of the metering element, photoelectrically causing a follow-up means to follow the light beam, continuously mechanically measuring both the value of the displacement of the light beam and at least the first derivative of the value of said displacement as determined from the displacement and velocity of movement of said follow-up means, displacing a member in accordance with said measurement, and controlling the variable according to the stated continuous displacement of the member to cause an earlier response of the metering of the variable than without such controlling.

20. The steps in the method of regulating the value of a physical variable to a predetermined value which comprise metering the value of the variable relative to the predetermined value by a corresponding position of a metering element, displacing a light beam from a fixed normal position in proportion to the displacement of the metering element, photoelectrically causing a follow-up means to follow the light beam, continuously mechanically measuring both the value of the displacement of the light beam and at least the first derivative of the value of said displacement as determined from the displacement and velocity of movement of said follow-up means, displacing a member in accordance with said measurement regeneratively modifying the measured value of the variable by an amount proportional to the stated continuous displacement of the member to tend to overcome any lag in the measurement of the variable, and also controlling the variable according to the stated continuous displacement of the member to cause an earlier effective substantial attainment of the predetermined value of the variable than without the last named controlling step.

21. In a regulator for a physical variable, the combination of a meter for said variable including a mirror for deflecting a focused beam of light reflected from the mirror, a photocell in the path of the beam, a servomotor electrically connected with the photocell to operate according to the illumination of the photocell, a means for controlling the variable and operated by said servomotor through an extent corresponding with that through which the servomotor operates, and a follow-up means operatively connecting the servomotor with the photocell with one portion of said follow-up means for initially moving the photocell, upon a change of said illumination, continuously away from its normal position in a direction to follow the beam, whereby the extent of initial servomotor operation is proportional to the departure of the photocell from its said normal position, and a second portion of said follow-up means coacting with the first portion to thereafter restore the photocell to its said normal position at a rate proportional to its departure therefrom, whereby the initial movements of the photocell and the controlling means both tend to be initially proportional to a sudden departure of the light beam from a normal position followed by a floating return of the photocell asymptotically to its normal position.

22. The combination set forth in claim 21 including a relay means connected with said photocell and with said servomotor and having a portion altered from a normal condition, in which the servomotor does not operate, in proportion to the lag of the photocell behind the light beam and a portion for continuously varying the speed of the servomotor in substantial proportion to the stated alteration.

23. In a regulator for a physical variable, the combination of means for positioning a beam of radiant energy in accordance with the value of the variable; a radiant energy responsive means in the path of the beam; a servomotor means including a servomotor governed by said responsive means to actuate the latter to follow the beam; a means for controlling the variable; and a device actuated by said servomotor to exert a governing effect upon the controlling means and including a substantially constant speed disk, a roller frictionally driven thereby at a rate depending upon the relative position of said disk and said roller, a means for altering said relative position in accordance with a time-function of the extent of the operation of said servomotor, and a means governed by said relative position for exerting a governing effect upon the position of the controlling means in accordance with said time-function.

24. In a control system, in conbination, means for varying radiant energy in response to temperature variations; a radiant energy responsive means responsive in accordance with such radiant energy variations and hence with the temperature variations; a relay means governed by said radiant energy responsive means, a proportional control apparatus stably operated under control of said relay means for initially, in substantial proportion to the extent of the stated radiant energy variation, varying a fuel supply to control said temperature; and means for moving said radiant energy responsive means initially simultaneously with the control apparatus and subsequently independently of said apparatus as long as the said radiant energy responsive means and the temperature return at proportional rates respectively to a normal position and to the predetermined temperature to gradually dissipate the stated proportionality to restore the relay to its normal position.

25. The steps in the method of regulating the value of a physical variable which comprise metering the value of the variable by a corresponding position of a metering element, displacing a light beam from a fixed normal position in proportion to the displacement of the metering element, photoelectrically causing a follow-up means to follow the light beam, continuously kinetically measuring a leading time-function of the displacement of the follow-up means including at least the first derivative of the value of the follow-up displacement, moving a member with a component movement whose extent is proportional to the stated kinetic measurement to provide an effective anticipatory effect, moving the member also with a floating component movement whose rate is substantially proportional to the value of the follow-up displacement, and controlling the variable according to the resultant movement of the member to cause an earlier response of the metering of the variable than without such controlling.

26. The steps in the method of regulating the value of a physical variable to a predetermined value which comprise metering the value of the variable relative to the predetermined value by a corresponding position of a metering element, displacing a light beam from a fixed normal position in proportion to the displacement of the metering element, photoelectrically causing a follow-up means to follow the light beam, continuously kinetically measuring a leading time-function of the displacement of the follow-up means including at least the first derivative of the value of the follow-up displacement, moving a member with a component movement whose extent is proportional to the stated kinetic measurement to provide an effective anticipatory effect, moving the member also with a floating component movement whose rate is substantially proportional to the value of the follow-up displacement, regeneratively modifying the measured value of the variable by an amount proportional to the stated extent of displacement of the member to tend to overcome any lag in the measurement of the variable, and also controlling the variable according to the resultant movement of the member to cause an earlier effective substantial attainment of the predetermined value of the variable than without the last named controlling step.

27. The steps in the method of regulating the value of a physical variable which comprise metering the value of the variable by a corresponding position of a metering element, displacing a light beam from a fixed normal position in proportion to the displacement of the metering element, photoelectrically causing a follow-up means to follow the light beam, continuously varying a force in accordance with a leading time-function of the displacement of the follow-up means including at least the first derivative of the value of the follow-up displacement, moving a member with a component movement whose extent is proportional to the value of said force to initially provide an effective anticipatory effect, moving the member also with a floating component whose rate is substantially proportional to the value of the follow-up displacement, and controlling the variable according to the resultant movement of the member to cause an earlier response of the metering of the variable than without such controlling.

28. The steps in the method of regulating the value of a physical variable to a predetermined value which comprise metering the value of the variable relative to the predetermined value by a corresponding position of a metering element, displacing a light beam from a fixed normal position in proportion to the displacement of the metering element, photoelectrically causing a follow-up means to follow the light beam, continuously varying a force in accordance with a leading time-function of the displacement of the follow-up means including at least the first derivative of the value of the follow-up displacement, moving a member with a component movement whose extent is proportional to the value of said force to initially provide an effective anticipatory effect, moving the member also with a floating component whose rate is substantially proportional to the value of the follow-up displacement, regeneratively modifying the measured value of the variable by an amount proportional to the stated extent of displacement of the member to tend to overcome any lag in the measurement of the variable, and also controlling the variable according to resultant movement of the member to cause an earlier effective substantial attainment of the predetermined value of the variable than without the last named controlling step.

29. In a regulator for a physical variable, the combination of a meter for said variable including a mirror for deflecting from a fixed normal position a focused beam of light reflected from the mirror, a photocell movable in the path of the beam to follow the beam, a servomotor electrically operatively-connected continuously to the photocell to be governed by said photocell to continuously operate at a velocity which tends to be proportional to the amount of positional lag of the photocell behind the beam as sensed by the photocell as long as said lag is appreciable, a follow-up means mechanically operatively-connecting the servomotor to the photocell to continuously move the photocell to follow the beam as long as said lag is appreciable, a mechanical means whose condition is continuously sensitive to a time-derivative function of the movement of the servomotor and hence of the photocell, a means whose condition is continuously sensitive to the distance between the instantaneous position of the photocell and that corresponding with said fixed normal position as long as said distance is appreciable, a controlling means for the variable, and a means operatively connecting the controlling means with both of said continuously sensitive means to govern the position of said controlling means in accordance with a time-function of the position of said photocell as determined jointly from the conditions of both of said continuously sensitive means.

30. In a regulator for a physical variable, the combination of a meter for said variable including a mirror for deflecting from a fixed normal position a focused beam of light reflected from the mirror, a photocell movable in the path of the beam to follow the beam, a servomotor electrically operatively-connected continuously to the photocell to be governed by said photocell to continuously operate at a velocity which tends to be proportional to the amount of positional lag of the photocell behind the beam as sensed by the photocell as long as said lag is appreciable, a follow-up means mechanically operatively-connecting the servomotor to the photocell to continuously move the photocell to follow the beam as long as said lag is appreciable and including a device for continuously modifying the velocity of moving the photocell by a factor that tends to be proportional to the distance of the instantaneous position of the photocell from that corresponding with said fixed normal position as long as said distance is appreciable, and a controlling means for the variable continuously positioned in correspondence with the position of the servomotor.

ED S. SMITH.